United States Patent [19]
Thrash

[11] Patent Number: 5,801,914
[45] Date of Patent: Sep. 1, 1998

[54] ELECTRICAL SAFETY CIRCUIT WITH A BREAKABLE CONDUCTIVE ELEMENT

[75] Inventor: Joseph L. Thrash, Hattiesburg, Miss.

[73] Assignee: Sunbeam Products, Inc., Delray Beach, Fla.

[21] Appl. No.: 652,898

[22] Filed: May 23, 1996

[51] Int. Cl.$^6$ .................................................. H02H 5/04
[52] U.S. Cl. ........................... 361/104; 337/300; 219/212
[58] Field of Search ........................... 361/104, 103, 361/106, 93; 337/300, 401; 219/212, 544, 545, 549

[56] References Cited

U.S. PATENT DOCUMENTS

| | | |
|---|---|---|
| Re. 28,656 | 12/1975 | Crowley et al. . |
| 3,114,825 | 12/1963 | Kilburn et al. . |
| 3,215,896 | 11/1965 | Shattuck et al. . |
| 3,325,718 | 6/1967 | McNulty . |
| 3,493,815 | 2/1970 | Hurtle . |
| 3,600,634 | 8/1971 | Muench, Jr. . |
| 3,628,093 | 12/1971 | Crowley . |
| 3,845,355 | 10/1974 | Lawson . |
| 3,878,434 | 4/1975 | Voorhoeve . |
| 3,968,407 | 7/1976 | Wilson . |
| 4,034,185 | 7/1977 | Crowley . |
| 4,251,718 | 2/1981 | Cole . |
| 4,271,350 | 6/1981 | Crowley . |
| 4,277,673 | 7/1981 | Kelly . |
| 4,309,596 | 1/1982 | Crowley . |
| 4,309,597 | 1/1982 | Crowley . |
| 4,436,986 | 3/1984 | Carlson . |
| 4,439,801 | 3/1984 | Fajt . |
| 4,547,658 | 10/1985 | Crowley ....................... 219/539 |
| 4,550,358 | 10/1985 | Crowley et al. . |
| 4,575,620 | 3/1986 | Ishii et al. ..................... 219/549 |
| 4,577,094 | 3/1986 | Mills ............................. 219/505 |
| 4,983,814 | 1/1991 | Ohgushi et al. ............... 219/545 |
| 5,081,339 | 1/1992 | Stine . |
| 5,369,247 | 11/1994 | Doljack . |
| 5,403,992 | 4/1995 | Cole . |
| 5,412,181 | 5/1995 | Giamati . |
| 5,420,397 | 5/1995 | Weiss et al. . |
| 5,451,747 | 9/1995 | Sullivan et al. . |

FOREIGN PATENT DOCUMENTS

| | | |
|---|---|---|
| 964817 | 7/1964 | United Kingdom . |
| 2075777 | 11/1981 | United Kingdom . |
| 2110019 | 6/1983 | United Kingdom . |
| 2168580 | 5/1988 | United Kingdom . |

*Primary Examiner*—Fritz Fleming
*Assistant Examiner*—Michael J. Sherry
*Attorney, Agent, or Firm*—Charles E. Kosinski; Micheal J. Kline

[57] ABSTRACT

An electrical safety circuit for discontinuing the operating power to an electrical device when overheat conditions are present. The safety circuit includes a conductive element in thermal proximity to at least one of the circuit elements of the electrical device that is energized by the operating power. The conductive element is structured so as to quickly break in response to high temperatures. A switching circuit is included which responds to a break in the conductive element by discontinuing the operating power to the electrical device.

16 Claims, 2 Drawing Sheets

ELECTRICAL SAFETY CIRCUIT WITH A BREAKABLE CONDUCTIVE ELEMENT

BACKGROUND OF THE INVENTION

The present invention relates to a safety circuit for use in connection with electrical devices.

In electrical devices, it is sometimes necessary to discontinue the operating power in order to prevent damage or injury due to overheating conditions. Substantial progress has been made in the development of safety means to accomplish this task in connection with electrically heated blankets and bed covers.

Electric blankets are typically formed with fabric shells which include passageways throughout the area of the blanket in which a tortuous low wattage heating element is threaded. In order to provide protection against the overheating of the heating element, it is known to locate bimetallic thermostats or continuous sensing wires in close proximity to the heating element in order to sense overheat conditions. Such safety means respond to overheat conditions by operating a relay or similar switching device to open the circuit and thus shut off operating power to the heating element.

In more modern electric blankets, the heating element consists of two spaced conductors which are enclosed by a positive temperature coefficient (PTC) material. Such a heating element is self-limiting from a temperature standpoint which enables it to compensate for some overheat conditions without requiring the operating power to be discontinued. However, separate means are still necessary for discontinuing the operating power if extreme overheat conditions exist such as when a broken or open circuit occurs in connection with one of the two conductors of the PTC heating element. Such safety means typically operate by blowing a fuse to interrupt the circuit before a dangerous condition develops.

SUMMARY OF THE INVENTION

The present invention provides an improved means for discontinuing operating power to an electrical device in an overheated condition.

The present invention is embodied in a safety circuit having a conductive element in thermal proximity to at least one of the circuit elements of an electrical device that is energized by an operating power. The conductive element is structured so as to quickly break in response to high temperatures. The safety circuit includes a switching circuit that is coupled to the conductive element and to the operating power, and which responds to a break in the conductive element by discontinuing the operating power to the electrical device.

These and other features, advantages and objects of the present invention will be further understood and appreciated by those skilled in the art by reference to the following specification, claims, and appended drawings.

DETAILED DESCRIPTION OF THE PREFERRED EMBODIMENT

The safety means of the present invention can be implemented in all types of electrical circuits, electrical devices, and power cords, including, but not limited to, electric blankets, electric heating pads, electric motors, and wiring circuitry for buildings. The following description focusses on the present invention's application within an electric blanket for the purposes of explanation.

Figure 1:
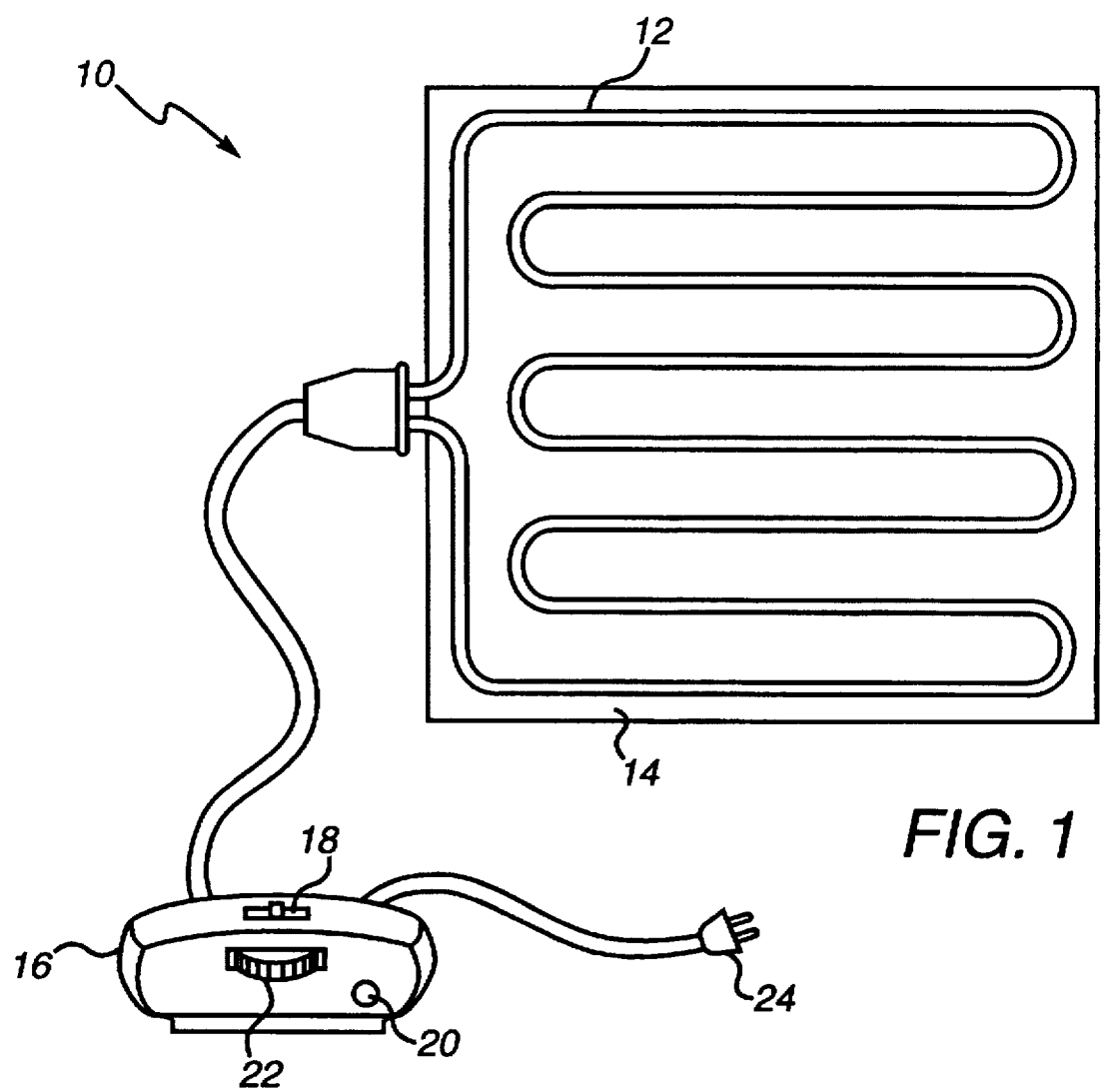
FIG. 1 is a schematic diagram of an electric blanket embodying the present invention.

Referring first to FIG. 1, shown is an electric blanket 10 in which the safety means of the present invention may be found. Blanket 10 includes an elongated heating element 12 that is looped back and forth through channels formed in an electric blanket shell 14 to provide heat evenly across the surface of the blanket in a well-known manner. Although only one heating element is shown which is typically on the order of 100 feet long, two or more heating elements may be included in a single blanket. A controller 16 is connected to heating element 12 and includes an on/off switch 18, a start button 20, and an adjustable heat control 22 that enables the operator of blanket 10 to adjust the heat generated by heating element 12. Controller 16 couples blanket 10 to a suitable source of electrical operating power through plug 24.

Figure 2:
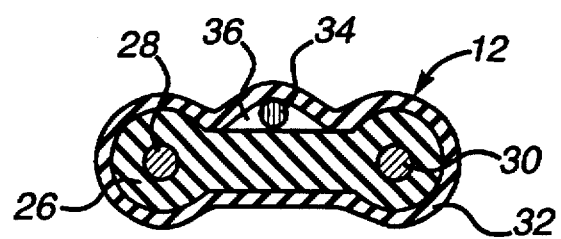
FIG. 2 is an enlarged sectional view of the positive temperature coefficient heating element of the present invention.

FIG. 2 shows a sectional view of heating element 12 of the present invention that is implemented in electric blanket 10. Heating element 12 is of a type utilizing a positive temperature coefficient (PTC) material 26 which is extruded between and around a pair of spaced conductors 28 and 30 and which forms a dogbone shape. A suitable electrically insulating coating 32 is extruded over PTC material 26. Although the specific structure of the PTC heating element may vary considerably, preferred embodiments of such a heating element are detailed in U.S. Pat. No. 4,277,673 to Kelly, issued on Jul. 7, 1981, entitled ELECTRICALLY CONDUCTIVE SELF-REGULATING ARTICLE, and in U.S. Pat. No. 4,309,596 to Crowley, issued on Jan. 5, 1982, entitled FLEXIBLE SELF-LIMITING HEATING CABLE, both patents of which are incorporated herein by reference. Typically, the PTC material in the heating element has a very high surface resistance, and is comprised of polyethylene, silicone rubber, or the like, having carbon black particles mixed therein in such a manner as to give specific temperature/resistance characteristics. In the preferred embodiment, each of conductors 28 and 30 have an insulating core over which conductor wire has been helically wound, with each core having been coated with a conducting graphite suspension, as detailed in U.S. Pat. No. 4,309,596 to Crowley. The coating applied to each core counteracts the high surface resistance of PTC material 26, resulting in a low resistance electrical interface between PTC material 26 and each of conductors 28 and 30. In operation, electrical current passes between conductors 28 and 30 and through material 26 therebetween. PTC material 26 provides a resistive heating area throughout the entire length of heating element 12 and, although shown in FIG. 3 as discrete parallel resistances, forms a single continuous resistance heater between conductors 28 and 30.

The formulation of PTC material 26 and the physical dimensions of its extrusion are selected so that the resistance and, thus, the heat dissipation per foot of length are reasonably constant at any given temperature. At low temperatures, the heat dissipation per foot will be greater than at normal room temperatures. When in an overheat or high temperature condition, the heat dissipation will be less than normal. PTC material 26 self-limits to produce a given heat dissipation or wire temperature for every different ambient and insulation system. In this way, when a section of blanket 10 is bunched up or abnormally restricted insofar as heat transfer is concerned (caused by, for example, something resting on top of the blanket), heating element 12 reacts to the new environment and reduces its heat dissipation in that area in an attempt to maintain a reasonably constant temperature.

Included in heating element 12 of the present invention is a conductive element 34 (FIG. 2) that runs parallel to conductors 28 and 30 throughout the length of the heating element. In the preferred embodiment, element 34 is a filament or fiber, and is positioned in a gap 36 (somewhat exaggerated in FIG. 2) between PTC material 26 and insulation coating 32. Positioned as such, fiber 34 is in close thermal proximity to conductors 28 and 30. However, unlike conductors 28 and 30, conductive fiber 34 is not coated with a conducting graphite suspension. Therefore, the high surface resistance of PTC material 26 causes conductive fiber 34 to be essentially electrically insulated, resulting in very little leakage current passing between fiber 34 and conductors 28 and 30. In the preferred embodiment, conductors 28 and 30 are separated by a distance of approximately 0.040 inches, and conductive fiber 34 is separated from each conductor by a distance of approximately 0.031 inches. The composition of fiber 34, described below, is such that it breaks when exposed to high temperatures associated with excessive overheating conditions which cannot be compensated for by the self-limiting nature of PTC material 26.

There are many types of materials and compositions that can be used for conductive element 34. Any metal, metal alloy, or electrically conductive material, and combinations thereof, can be used, including, but not limited to,:

Stainless steel
Zirconium/copper
Copper and copper alloys
Nickel and nickel alloys
Platinum
Lead and lead alloys
Silver
Nickel/chromium
Gold
Nickel/chromium/iron
Aluminum
Brass
Zinc alloys
Beryllium/copper
Bronze
Iron
Iron/chromium/aluminum
Cadmium alloys
Tin and tin alloys
Carbon
Phosphor/bronze Also, any metallic or electrically-conductive coated fiber or yarn can be used for conductive fiber 34, including, but not limited to,:

Silver coated yarn
Nickel coated yarn
Graphite coated yarn
Copper coated yarn
Copper/silver coated yarn
Silver/nickel coated yarn
Graphite/iron oxide coated yarn
Carbon coated yarn Furthermore, any yarn having any combination of metallic or electrically-conductive fillers can be used for conductive fiber 34, including, but not limited to,:

Silver filled plastic yarn
Nickel filled plastic yarn
Carbon filled plastic yarn
Graphite filled plastic yarn
Copper/silver filled yarn
Silver/nickel filled yarn
Aluminum filled yarn
Copper filled yarn
Gold filled yarn Many types of optical fibers can also be used for conductive fiber 34.

Several of the above-mentioned materials and compositions were tested in an effort to determine which constitute the preferred embodiments of conductive fiber 34. Tested were stainless steel fiber, stainless steel fibers twisted around a polyester yarn, silver-coated polyester yarn, silver-coated polyethylene yarn, and silver-coated polypropylene yarn. Although all of the tested materials and compositions functioned well, it was determined that stainless steel fibers twisted around a polyester yarn is the most preferred material. The specific type of the most preferred material that was actually tested consists of four strands of 35 micron stainless steel fiber which are twisted around two 150 denier (equivalent to approximately 0.006 inch diameter) strands of polyester yarn, and is available from Bekaert Fibre Technologies as VN 35/4 polyester-stainless steel yarn. The polyester contained within this most preferred material has a typical melting point of 256 degrees Celsius, and the stainless steel has a typical melting point of approximately 1500 degrees Celsius.

Among the other materials tested for conductive fiber 34, it was determined that the second most preferred material is stainless steel fiber (without the polyester yarn). The specific type of the second most preferred material that was actually tested consists of 90 strands of 14 micron stainless steel fiber (having a typical melting point of approximately 1500 degrees Celsius), and is available from Bekaert Fibre Technologies as Bekinox #VN 14/1X90/150Z The two above-mentioned most preferred compositions for conductive fiber 34 are preferred because they are strong enough to withstand the normal flexing, handling, and laundering of electric blankets, and are flexible enough so as to not make a blanket too stiff. Furthermore, for reasons discussed in greater detail below, the stranding of the stainless steel is small enough that heat will cause conductive fiber 34 to sever before the blanket fabric can be ignited. The polyester in the most preferred embodiment is beneficial in that it adds strength to the stainless steel fiber strands in order to facilitate the manufacturing process.

Figure 3:
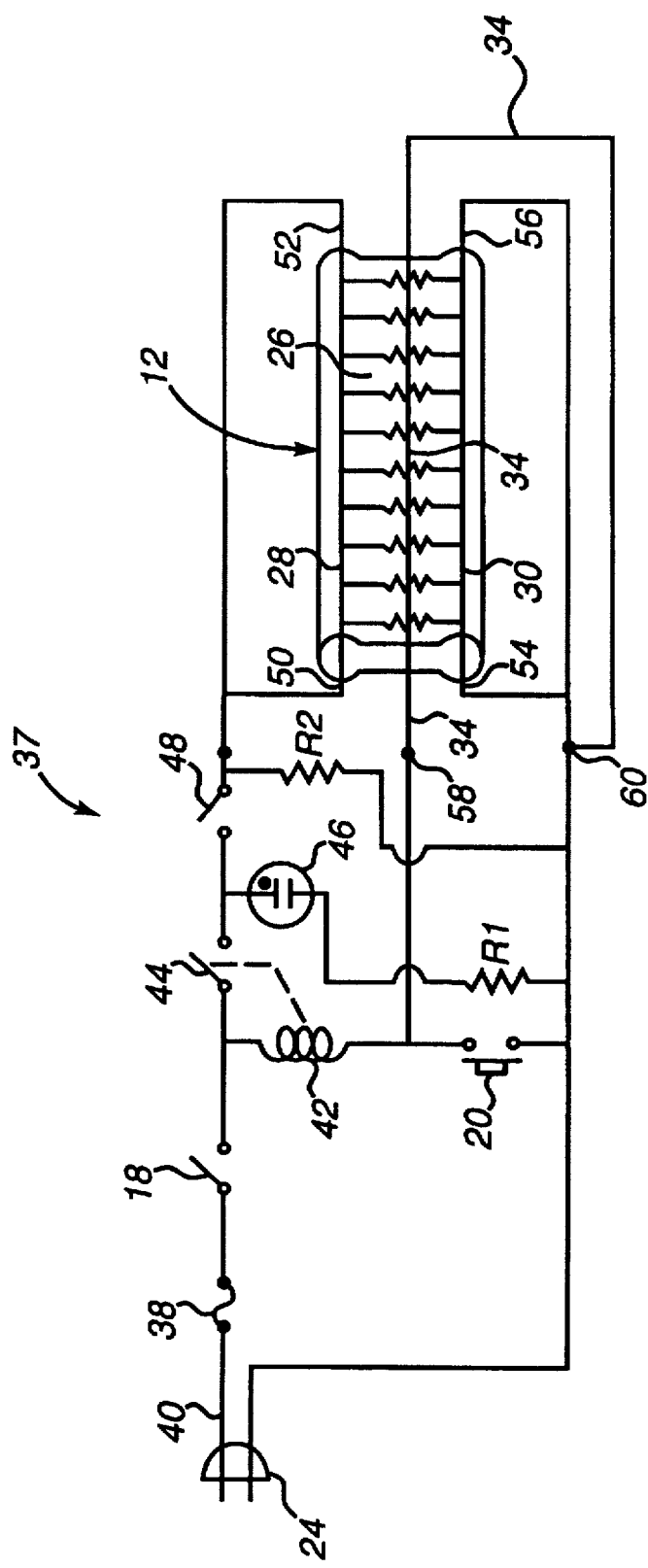
FIG. 3 is a schematic circuit diagram of the safety circuit of the present invention.

Referring now to FIG. 3, shown is a schematic circuit diagram of the safety circuit 37 of the present invention, the majority of which is housed within controller 16 (FIG. 1). Plug 24 couples the safety circuit to a suitable source of electrical operating power which is typically AC line voltage. A fuse 38 is included which is connected in series with power lead 40 and which serves to interrupt the circuit when the current through it exceeds a predetermined value. In the preferred embodiment, fuse 38 is rated at 5 amperes which specifies that it will open the circuit if the current is at least 4.5 amperes (90 percent of its rating). The rating of fuse 38 is high enough so that it will not blow out due to the normally high inrush currents, typically of about 4 amperes, that are temporarily experienced when power is first supplied to blanket 10. Such high inrush currents are caused by the fact that PTC material 26, when cool, has a very low resistance which rises quickly upon energization of heating element 12. However, fuse 38 will quickly blow out and deenergize the circuit if a shorted condition develops in heating element 12, as described below.

Connected in series with fuse 38 is on/off switch 18 that is controlled by the operator of blanket 10 (FIG. 1). Switch 18 is closed when in the "on" position so as to couple the rest of the safety circuit to the source of electrical operating power. The safety circuit includes a relay comprised of a relay coil 42 and a normally open relay switch 44. In the preferred embodiment, the relay has a 115 volt AC voltage coil and a single pole switch, and is manufactured by Cornell Dubilier Corporation. Coupled to relay coil 42 is start button 20 which, when momentarily pressed by the operator at a time when on/off switch 18 is closed ("on"), causes a completed circuit to be formed whereby relay coil 42 will be energized and will have a sufficient current through it to cause relay switch 44 to close. After the start button 20 is released, the completed circuit formed with conductive fiber 34 (described below), although inducing less current through relay coil 42 than start button 20, will thereafter cause relay coil 42 to be sufficiently energized so as to keep relay switch 44 closed. In the preferred embodiment, start button 20 is a single pole single throw normally open momentary switch that is manufactured by Grayhill Corporation.

The safety circuit includes a gas tube 46 which is energized when relay switch 44 and on/off switch 18 are closed. Gas tube 46 emits light when energized as such, and serves as an indicator light to indicate that the electric blanket is in use. In series with gas tube 46 is a current limiting resistor R1. In the preferred embodiment, gas tube 46 is a neon bulb, resistor R1 is a 62 KOhm resistor, and the combination of tube 46 and resistor R1 is rated at 120 volts.

Also included in the safety circuit is a bimetallic thermostat 48 that is in close physical and thermal proximity to a resistor R2. Resistor R2 is connected so that it is energized, and thus generates heat, whenever heating element 12 is generating heat, and is a 62 KOhm carbon resistor in the preferred embodiment. In a manner well-known to one of ordinary skill in the art, thermostat 48 operates like a switch in relation to its temperature which is determined by the heat emitted by resistor R2. In particular, thermostat 48 is "closed" when the temperature thereof is below a threshold value, and is "opened" when the threshold temperature is exceeded. The threshold temperature, and thus the sensitivity of thermostat 48, is controlled by adjustable heat control 22 of controller 16 (FIG. 1). When the threshold temperature is exceeded and thermostat 48 is opened, neither resistor R2 nor heating element 12 is energized, causing them to cease generating heat and to begin to cool. When resistor R2 has cooled to the point where the temperature of thermostat 48 falls below the threshold temperature, thermostat 48 closes, causing resistor R2 and heating element 12 to once again be energized. This cyclic nature enables the operator of blanket 10 to effectively control the amount of heat generated by heating element 12 by means of adjustable heat control 22.

FIG. 3 also shows heating element 12. When on/off switch 18, relay switch 44, and bimetallic thermostat 48 are closed, heating element 12 is energized and generates heat by means of current passing between conductors 28 and 30 through the resistive PTC material 26. For reasons discussed below, the two ends 50 and 52 of conductor 28 are coupled together, and the two ends 54 and 56 of conductor 30 are coupled together. As described above, heating element 12 includes conductive element or fiber 34 which is coupled to the operating power and, in FIG. 3, extends from point 58 to point 60 and through the length of heating element 12. Conductive fiber 34, electrically insulated from PTC material 26 and conductors 28 and 30, is coupled to relay coil 42 and forms a completed circuit path which conducts current when on/off switch 18 is closed. As mentioned above, this current energizes relay coil 42, thus keeping relay switch 44 closed.

Electric blankets, such as the one described above, are conventionally used in much the same manner as nonelectric blankets. In particular, it is common for electric blankets to be flexed and folded repeatedly, either during use, between uses, or when washed. In view of these demands made on electric blankets, it is necessary that the heating elements contained in such electric blankets be made of suitable dimensions and materials so that they can be repeatedly flexed without breaking or resulting in other problems. In spite of the careful design and manufacture of such heating elements, there may be occasions when a heating element is damaged to the point where overheating conditions are created if the blanket is connected to operating power. Such overheating conditions may burn the heating element. Examples of such damage to a heating element include when breaks or faults develop in one or more conductors contained in the heating element, or when a short is created between the conductors. The overheating conditions are often caused by electrical arcs that can reach high temperatures of over several hundred degrees Celsius.

The above-described safety circuit of the present invention prevents or eliminates problems of this type. In the situation where a single break occurs in either conductor 28 or 30, only a relatively small voltage drop, if any, is created across the break since the ends of each conductor are connected together and coupled to the operating power. The exact magnitude of this voltage drop is dependant on the location of the break with respect to the ends of the conductor. A break at the middle of conductor 28 or 30 produces no voltage drop across the break, whereas a break at one end of the conductor produces a maximum voltage drop equal to the total voltage drop through the length of the conductor. The voltage drop through the conductor is dependant on the internal resistance of the conductor which is kept sufficiently low so that even the maximum voltage drop situation does not create an electrical arc at the break. In the above-described manner, described in greater detail in UK Patent No. 2,168,580 to Crowley, entitled ELECTRIC BLANKET OR PAD and incorporated herein by reference, the safety circuit prevents a single break in one or both of conductors 28 and 30 from creating an overheating condition.

However, in the situation where two breaks occur in either conductor 28 or 30, the voltage drop across one or both breaks is usually very significant, resulting in the creation of an electrical arc. Such an arc, as mentioned above, can generate excessive heat which, if the operating power is not discontinued, can create a hazardous situation by burning PTC material 26, insulating coating 32, and ultimately the fabric of blanket 10.

Conductive fiber 34 of the safety circuit of the present invention prevents a hazardous situation from developing when two breaks occur in either conductor 28 or 30. As mentioned above, fiber 34 is in close physical and thermal proximity to conductors 28 and 30 and is formed of material which causes it to sever when exposed to high temperatures.

As such, conductive fiber 34 will not break during normal operation of blanket 10 when heating element 12 is generating the desired amount of heat, but will quickly break if excessive overheating conditions develop such as that caused by an electrical arc. Such a break in conductive fiber 34 will open the circuit path which normally conducts current through relay coil 42. The break will thus deenergize relay coil 42, causing relay switch 44 to open and to discontinue operating power to heating element 12. The materials used for conductive fiber 34, described above, are selected so that fiber 34 will sever, and the operating power will be discontinued, before any hazardous situation develops.

In the situation where a short circuit condition occurs between conductors 28 and 30, the current throughout the safety circuit will increase. If the short is severe, the increased current through conductors 28 and 30, if the operating power is not discontinued, may cause heating element 12 to overheat, even to the point where electrical arcing occurs, such that a hazardous situation develops. Fuse 38 of the safety circuit prevents such overheating conditions by opening the circuit, thus discontinuing the operating power, if the current through it exceeds a predetermined value which, in the preferred embodiment, is approximately 5.0 amperes. However, in the unlikely event that fuse 38 should happen to malfunction, conductive fiber 34 will prevent a hazardous situation from developing. In the manner described above, fiber 34 will sever, thus discontinuing the operating power, if the temperature of heating element 12 reaches a dangerously high level due to the short.

From the above description, it can be seen that conductive fiber 34 and the safety circuit of the present invention can be easily implemented to protect against overheating conditions in almost any situation. Furthermore, the benefits of such a safety circuit can be realized in all types of electrical circuits, electric devices, and power cords, regardless of whether the operating power is AC or DC.

The above description is considered that of the preferred embodiment only. Modifications of the invention will occur to those skilled in the art and to those who make or use the invention. Therefore, it is understood that the embodiment shown in the drawings and described above are for illustrative purposes and are not intended to limit the scope of protection of the invention, which is defined by the foregoing claims as interpreted according to the principles of patent law.

I claim:

1. An electrical safety circuit for an electrical device having circuit elements that are energized by an operating power, the safety circuit comprising:
   a conductive element in thermal proximity to at least one of the circuit elements that are energized by the operating power, said conductive element structured for breaking in response to high temperatures; and
   a switching circuit coupled to said conductive element and the operating power, said switching circuit responding to a break in said conductive element by discontinuing the operating power to the electrical device.

2. The safety circuit as defined in claim 1 wherein said conductive element comprises stainless steel fibers twisted around a polyester yarn.

3. The safety circuit as defined in claim 1 wherein said conductive element comprises stainless steel fiber.

4. The safety circuit as defined in claim 1 wherein said switching circuit comprises a relay.

5. The safety circuit as defined in claim 1 further comprising a fuse that is coupled to the operating power, said fuse discontinuing the operating power to the electrical device when a predetermined current level is exceeded.

6. The safety circuit as defined in claim 1 wherein the electrical device is an electric blanket.

7. The safety circuit as defined in claim 1 wherein the at least one circuit element is a positive temperature coefficient heating element having two spaced conductors, and wherein said conductive element is contained within the heating element and runs parallel to the conductors.

8. The safety circuit as defined in claim 7 wherein each of the two spaced conductors has two ends which are connected together.

9. The safety circuit as defined in claim 1 wherein said conductive element breaks before a fire is ignited in the electrical device.

10. The safety circuit as defined in claim 1 wherein said conductive element breaks if an open circuit or short circuit condition occurs in the electrical device.

11. An electrical safety circuit for an electrical device having circuit elements that are energized by an operating power, the safety circuit comprising:
   a means for conducting current, said conducting means in thermal proximity to at least one of the circuit elements that are energized by the operating power, said conducting means structured for materially breaking in response to high temperatures of the at least one circuit element; and
   a means for responding to a break in said conducting means by discontinuing the operating power to the at least one circuit element.

12. A method for protecting an electrical device that is energized by an operating power and in which an overheating condition may occur, the method comprising the steps of:
   positioning a conductive element in thermal proximity to the potential site of an overheating condition;
   severing said conductive element in response to an overheating condition; and
   implementing a responsive circuit to discontinue the operating power to the site of the overheating condition in response to the severing of said conductive element.

13. An electrical safety circuit for an electrical device having circuit elements that are energized by an operating power, the safety circuit comprising:
   a conductive element in proximity to at least one of the circuit elements, said conductive element structured for breaking in response to heat from the at least one circuit element exceeding a predetermined level;
   a switching circuit responsive to a break in said conductive element for discontinuing the operating power; and
   wherein the at least one circuit element is a heating element having at least one conductor, and wherein said conductive element is contained within the heating element and runs substantially parallel to the at least one conductor.

14. The safety circuit as defined in claim 13 wherein the heating element is a positive temperature coefficient heating element having two spaced conductors, and wherein each of the two spaced conductors has two ends which are connected together.

15. In an electrical device having a circuit element that is energized by an operating power, the combination comprising:

a conductive element substantially coextensive with and in proximity to the circuit element, said conductive element adapted for breaking in response to heat from the circuit element exceeding a predetermined level; and a responsive circuit coupled to said conductive element and the operating power, said responsive circuit responding to a break in said conductive element by discontinuing the operating power to the circuit element.

16. In an electrical device having an element that is energized by an operating power, the combination comprising:

a conductor in proximity to the element, said conductor configured for breaking in a non-revertible manner in response to heat from the element exceeding a predetermined level; and a responsive circuit coupled to said conductor and the operating power, said responsive circuit responding to a break in said conductor by discontinuing the operating power to the element.

* * * * *